US009247416B1

(12) United States Patent
Daniel

(10) Patent No.: US 9,247,416 B1
(45) Date of Patent: Jan. 26, 2016

(54) SMART SUBSCRIBER IDENTIFICATION MODULE SYSTEM AND METHOD

(71) Applicant: Isaac S. Daniel, Miramar, FL (US)

(72) Inventor: Isaac S. Daniel, Miramar, FL (US)

( * ) Notice: Subject to any disclaimer, the term of this patent is extended or adjusted under 35 U.S.C. 154(b) by 0 days.

(21) Appl. No.: 13/773,245

(22) Filed: Feb. 21, 2013

Related U.S. Application Data

(63) Continuation-in-part of application No. 13/675,960, filed on Nov. 13, 2012, now Pat. No. 8,787,879, and a continuation-in-part of application No. 13/689,562, filed on Nov. 29, 2012.

(60) Provisional application No. 61/601,352, filed on Feb. 21, 2012.

(51) Int. Cl.
*H04B 7/00* (2006.01)
*H04W 8/18* (2009.01)

(52) U.S. Cl.
CPC .................................... *H04W 8/183* (2013.01)

(58) Field of Classification Search
CPC ...... G01S 13/765; H04M 1/00; H04W 8/183; H04W 8/265; H04W 48/16; H04W 8/30
USPC .............. 455/414.1, 418, 419, 433, 434, 435, 455/550.1, 552.1, 558, 575.1, 413, 455/432.1–432.3, 435.1, 435.2, 551
See application file for complete search history.

(56) References Cited

U.S. PATENT DOCUMENTS

| | | | | |
|---|---|---|---|---|
| 2009/0149175 | A1* | 6/2009 | Lopresti et al. | 455/433 |
| 2011/0081951 | A1* | 4/2011 | Hwang | 455/558 |
| 2011/0294472 | A1* | 12/2011 | Bramwell et al. | 455/432.3 |
| 2012/0238323 | A1* | 9/2012 | Camilleri et al. | 455/558 |

* cited by examiner

*Primary Examiner* — Thanh Le
(74) *Attorney, Agent, or Firm* — Alberto Interian, III, Esq.

(57) ABSTRACT

A system that includes at least one processor, at least one subscriber identification module connected to the at least one processor, wherein the at least one subscriber identification module is operative to store a plurality of subscriber identities that are each associated with a unique telephone number, respectively, at least one location determination module connected to the at least one processor, and computer executable instructions readable by the at least one processor and operative to use the at least one location determination module to determine at least one location of the at least one location determination module, at least one processor, or at least one subscriber identification module, and select at least one of the plurality of subscriber identities based on the at least one location.

20 Claims, 6 Drawing Sheets

US 9,247,416 B1

SMART SUBSCRIBER IDENTIFICATION MODULE SYSTEM AND METHOD

PRIORITY CLAIM

The present application is an non-provisional patent application based on U.S. provisional patent application Ser. No. 61/601,352, titled "Smart Subscriber Identification Module," filed on Feb. 21, 2012, and (i) a continuation-in-part of U.S. non-provisional patent application Ser. No. 13/675,960, titled "Multiple SIM Card Secure Global Mobile Device," filed on Nov. 13, 2012, and (ii) a continuation-in-part of U.S. non-provisional patent application Ser. No. 13/689,562, titled "Secure Global Mobile Communications Device and Home Base Station," filed on Nov. 29, 2012, all of whose priorities are claimed and whose entire disclosures are incorporated by reference as if fully state herein.

FIELD

The present disclosure relates generally to electronics systems, and more specifically to mobile communications systems.

BACKGROUND

Many people often have trouble managing more than one mobile phone number, since it traditionally requires having a separate phone for each SIM card associated with a phone number. People have gone around this by swapping out SIM cards from a single phone, or by purchasing dual-SIM card phones.

More recently, there have been advancements in SIM card technology, allowing users to store multiple phone numbers on a single SIM card, however such systems require users to manually change phone numbers by removing the SIM card, using a SIM card reader connected to a computer and a computer application to manually switch phone numbers, which remains a cumbersome and inconvenient task.

SUMMARY OF THE DISCLOSURE

The present disclosure results from the realization that multiple phone numbers may be managed more easily by providing an electronic system and method for automatically selecting a subscriber identity stored on a subscriber identification module, wherein the subscriber identity selection is based on a geographic location of the subscriber identification module and/or an available service network provider.

DETAILED DESCRIPTION OF PREFERRED EMBODIMENTS

Figure 1A:
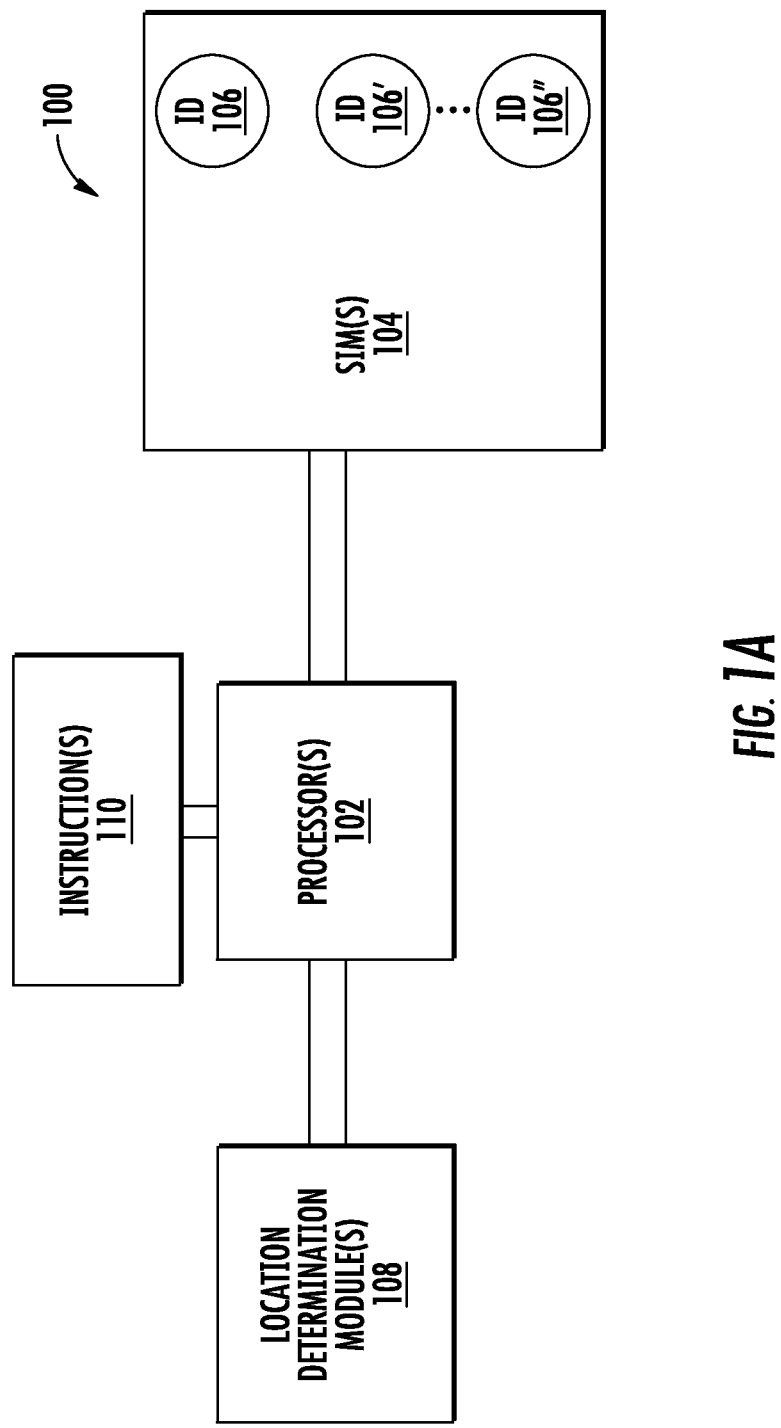
FIG. 1A shows a system in accordance with one embodiment.
Figure 1B:
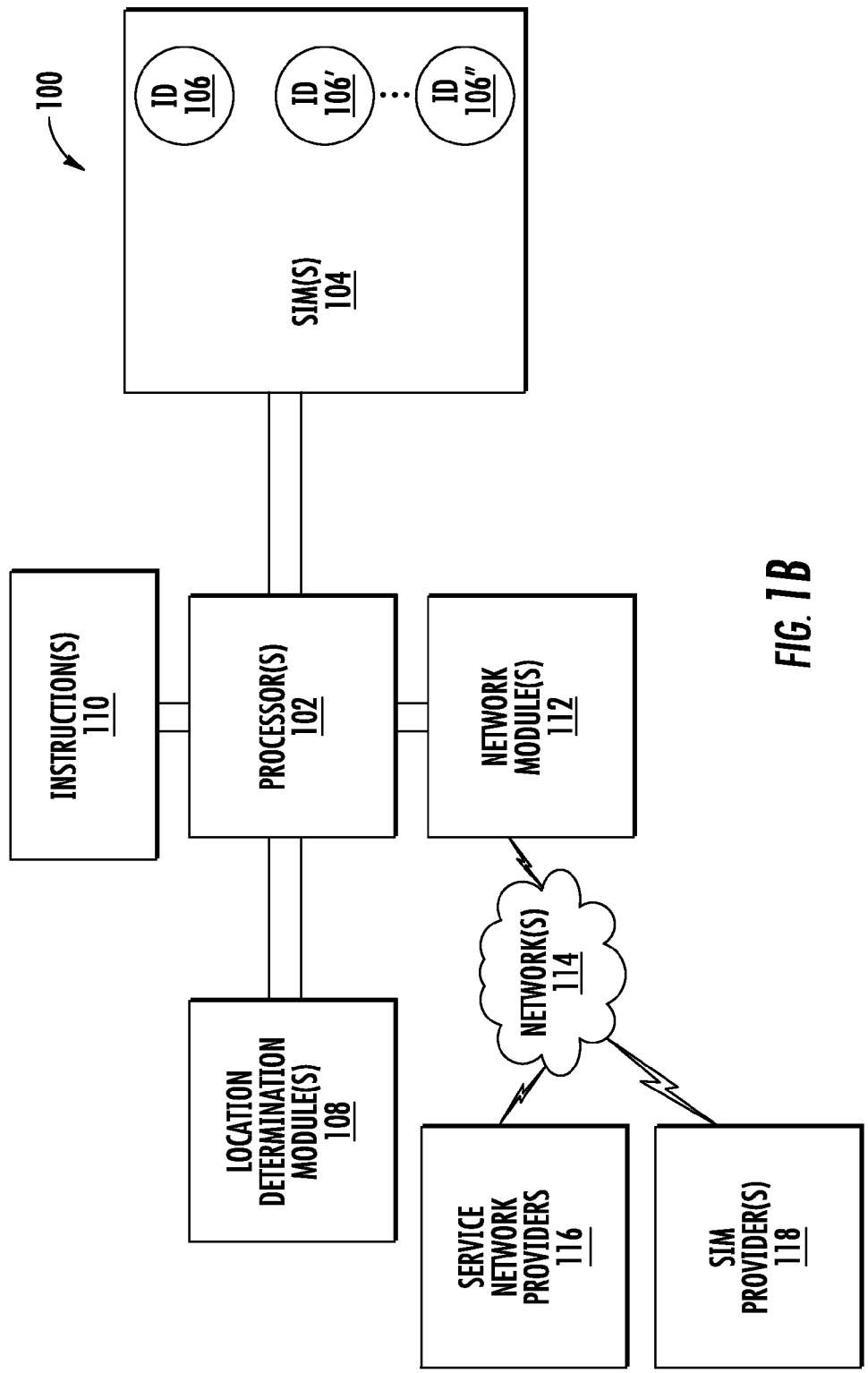
FIG. 1B shows a system in accordance with another embodiment.

FIGS. 1A and 1B show a system 100 in accordance with one embodiment, wherein system 100 comprises at least one processor 102, at least one subscriber identification module ("SIM") 104 connected to processor 102, wherein SIM is operative to store a plurality of subscriber identities 106, 106', 106", that are each associated with a unique communications designator, respectively, at least one location determination module 108 connected to processor 102, and computer executable instructions 110 readable by processor 102 and operative to use location determination module 108 to determine at least one location of location determination module 108, processor 102, or SIM 104, and select at least one of the plurality of subscriber identities 106 based on the at least one location.

In some embodiments, the unique communications designator may comprise any communications designator, such as a telephone number, an e-mail address, an instant messaging identity or account, a social media account, and the like.

In some embodiments, system 100 may comprise at least one processor 102, at least one subscriber identification module 104 connected to at least one processor 102, wherein at least one subscriber identification module 104 may be operative to store a plurality of subscriber identities 106 that are each associated with a unique telephone number, respectively, at least one location determination module 108 connected to the at least one processor, and computer executable instructions 110 readable by at least one processor 102 and operative to use at least one location determination module 108 to determine at least one location of at least one location determination module 108, and automatically select at least one of the plurality of subscriber identities 106 for use based on the at least one location.

The terms "communicate," "communication," "connect," or "connection," as used herein, may refer to electronic communications and connections, which may be wireless or wired.

In some embodiments, at least one processor 102 may be any type of processor. At least one processor 102 may be part of or integrated into a mobile communications device, such as a mobile phone, a smartphone, a PC, a laptop, a tablet PC, and the like.

At least one subscriber identification module 104 may be any type of subscriber identification module ("SIM"), such as a GSM SIM card, a software based SIM, a digital SIM, a smart SIM card, and the like. SIM 104 may be a fixed or removable SIM card. SIM 104 may be operative to be inserted into a communications device, such as a smartphone, a mobile phone, a tablet PC, a laptop, and the like.

Subscriber identity 106 may be any type of identity, such as a unique identification number, wherein the unique identification number may be associated with a specific telephone number, user account, communications device, service provider, and the like. In another embodiment, each subscriber identity 106 may be associated with a specific geographic region, including the location determined by location determination module 108 or communications network service provider.

At least one location determination module 108 may comprise any type of location determination module, such as a global positioning system module, a GSM positioning module, a local positioning system module, a WiFi positioning system module, and the like. Accordingly, computer executable instructions 110 may be operative to automatically select the specific subscriber identity 106 that is associated with the location of location determination module 108.

In some embodiments, computer executable instructions 110 may be stored on a computer readable medium readable by processor 102, wherein the computer readable medium may comprise a transitory computer readable medium, such as a signal, or a non-transitory computer readable medium, such as computer memory, computer storage, and the like. The computer readable medium may be part of the same device of which processor 102, SIM 104, and/or module 108 are a part.

In another embodiment, system 100 further comprises at least one communications service network module 112 for connecting to a communications service network 114 (as shown in FIG. 1B), wherein module 112 may be connected to at least one processor 102, and may be part of a mobile device or similar computing device. Computer executable instructions 110 may be operative to use module 112 to determine an available service network provider 116, select (including automatically selecting or manually selecting) a subscriber identity 106 for use based on available service network provider 116. In some embodiments, computer executable instructions 110 may be operative to automatically select the specific subscriber identity 106 that is associated with available service network provider 116. In other embodiments, computer executable instructions 110 may be operative to automatically select the specific subscriber identity 106 that is associated with the service network provider 116 that has the best reception, signal, speed, bandwidth, or availability.

In a further embodiment, computer executable instructions 110 may be operative to determine when a subscriber identity 106 has been selected, and use means 112 for connecting to communications service network 114 to notify a smart SIM card service provider 118 that a subscriber identity 106 has been selected for use. Smart SIM card service provider 118 may be operative to assess a fee to a user of system 100 upon being notified that subscriber identity 106 has been selected for use. Assessing a fee to a user of system 100 may comprise assessing a fee to a communications network service provider. Smart SIM card service provider may be operative to broker a roaming fee between a user's primary or domestic communications network service provider, and a user's secondary or foreign communications network service provider.

In yet a further embodiment, computer executable instructions 110 may be operative to prompt a user to select a subscriber identity 106, which may include presenting an option to select a subscriber identity. The user may be prompted when a new location has been determined, when a new network service provider has been found, when a network service provider with greater capabilities, such as signal strength, speed, bandwidth, and the like, has been found, or when no network service provider has been found. The user may be prompted to manually select a subscriber identity 106. The user may be prompted prior to automatically selecting a subscriber identity 106. If a user does not make a selection, such as within a specified period of time, the computer executable instructions 110 may be operative to automatically select at least one of the subscriber identities 106.

Figure 2:
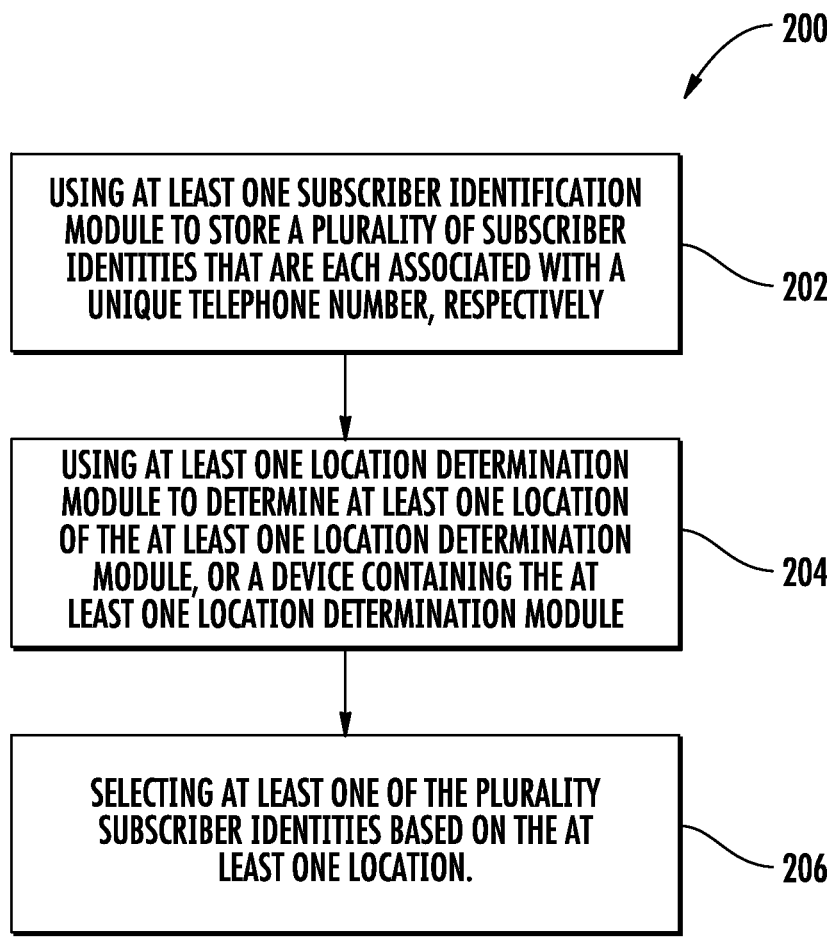
FIG. 2 shows a flow chart depicting a method in accordance with one embodiment.

Referring now to FIG. 2, a flow chart depicting a method 200 is shown in accordance with one embodiment, wherein method 200 may comprise using at least one subscriber identification module to store a plurality of subscriber identities that are each associated with a unique communications designator, respectively (block 202), using at least one location determination module to determine at least one location of the at least one location determination module, a device containing the at least one location determination module, or the at least one subscriber identification module (block 204), and selecting at least one of the plurality of subscriber identities based on the at least one location (block 206).

In some embodiments, the subscriber identification module may comprise any or all of those embodiments presently and previously disclosed herein, including those embodiments described above with reference to FIGS. 1A and 1B.

In some embodiments, the subscriber identities may comprise any or all of those embodiments presently and previously disclosed herein, including those embodiments described above with reference to FIGS. 1A and 1B.

In some embodiments, the location determination module may comprise any or all of those embodiments presently and previously disclosed herein, including those embodiments described above with reference to FIGS. 1A and 1B.

In yet more embodiments, the device containing the at least one location determination module may comprise a computing and/or communications device, which may comprise any or all of those embodiments presently and previously disclosed herein, including those embodiments described above with reference to FIGS. 1A and 1B.

In some embodiments, using at least one subscriber identification module to store a plurality of subscriber identities may comprise any or all of those embodiments presently and previously disclosed herein, including those embodiments described above with reference to FIGS. 1A and 1B.

In some embodiments, using at least one location determination module to determine at least one location may comprise any or all of those embodiments presently and previously disclosed herein, including those embodiments described above with reference to FIGS. 1A and 1B.

In yet another embodiment, selecting at least one of the plurality of subscriber identities may comprise any or all of those embodiments presently and previously disclosed herein, including those embodiments described above with reference to FIGS. 1A and 1B.

In some embodiments, method 200 may further comprise using at least one communications service network module to determine an available service network provider, and selecting a subscriber identity based on the available service network provider, wherein the communications service network module and service network provider may comprise any or all of those embodiments presently and previously disclosed herein, including those embodiments described above with reference to FIGS. 1A and 1B.

In some embodiments, method 200 may comprise assessing a fee to a user when a subscriber identity has been selected. In some embodiments, assessing a fee may comprise any or all of those embodiments presently and previously disclosed herein, including those embodiments described above with reference to FIGS. 1A and 1B.

In yet another embodiment, method 200 may comprise brokering a roaming fee between a user's primary or domestic communications network service provider and a user's secondary or foreign communications network service provider, wherein brokering may comprise any or all of those embodiments presently and previously disclosed herein, including those embodiments described above with reference to FIGS. 1A and 1B.

Figure 3:
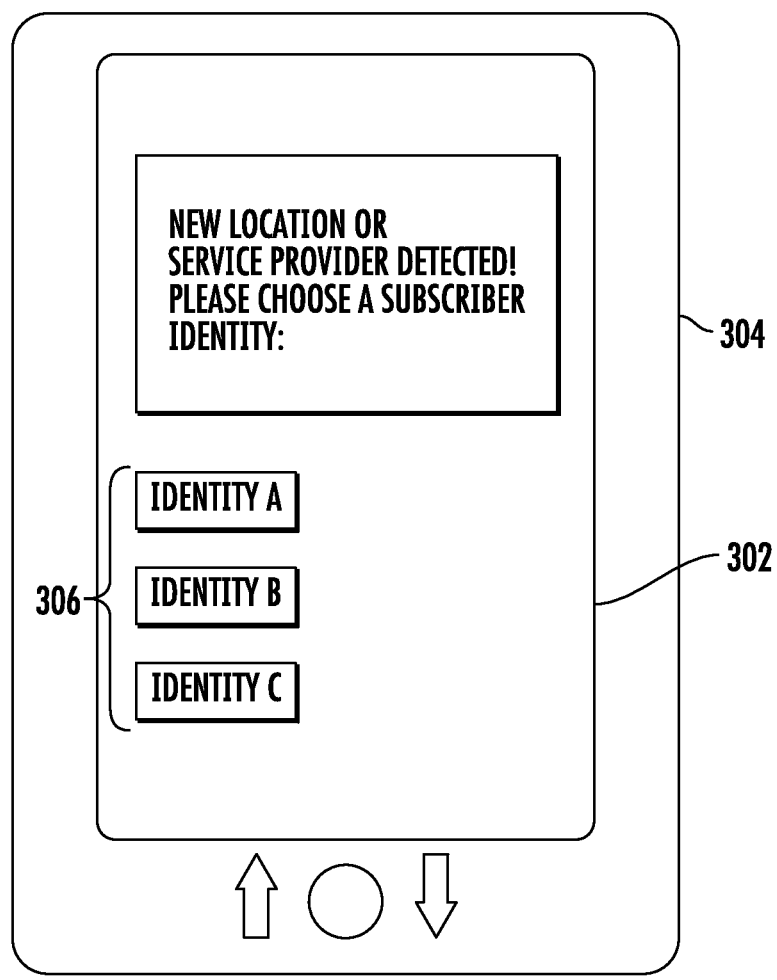
FIG. 3 shows a computing and/or communications device in accordance with one embodiment.

In some embodiments, method 200 may comprise presenting a subscriber identity selection, which may comprise any or all of those embodiments presently and previously disclosed herein, including those embodiments described above with reference to FIGS. 1A and 1B. In some embodiments, presenting a subscriber identity selection may comprise using a display device (shown in FIG. 3 as 302) connected to or integrated with a computing or communications device (shown in FIG. 3 as 304) to present a subscriber identity selection 306, and allow at least one user to use a user input device to may the selection. In some embodiments, the user input device may comprise a keyboard, touchscreen, voice recognition system coupled to a microphone, gesture control system, and the like.

In some embodiments, method 200 may comprise associating a subscriber identity with a geographic location, such as the location determined by the location determination module, or a communications network service provider. In some embodiments, associating may comprise any or all of those embodiments presently and previously disclosed herein, including those embodiments described above with reference to FIGS. 1A and 1B.

In some embodiments, selecting at least one of the plurality of subscriber identities based on the at least one location comprises automatically selecting at least one of the plurality of subscriber identities based on the at least one location. In some embodiments, automatically selecting at least one of the plurality of subscriber identities comprises automatically selecting at least one of the plurality of subscriber identities after a user has been presented with the option to select at least one of the plurality of subscriber identities.

Figure 4:
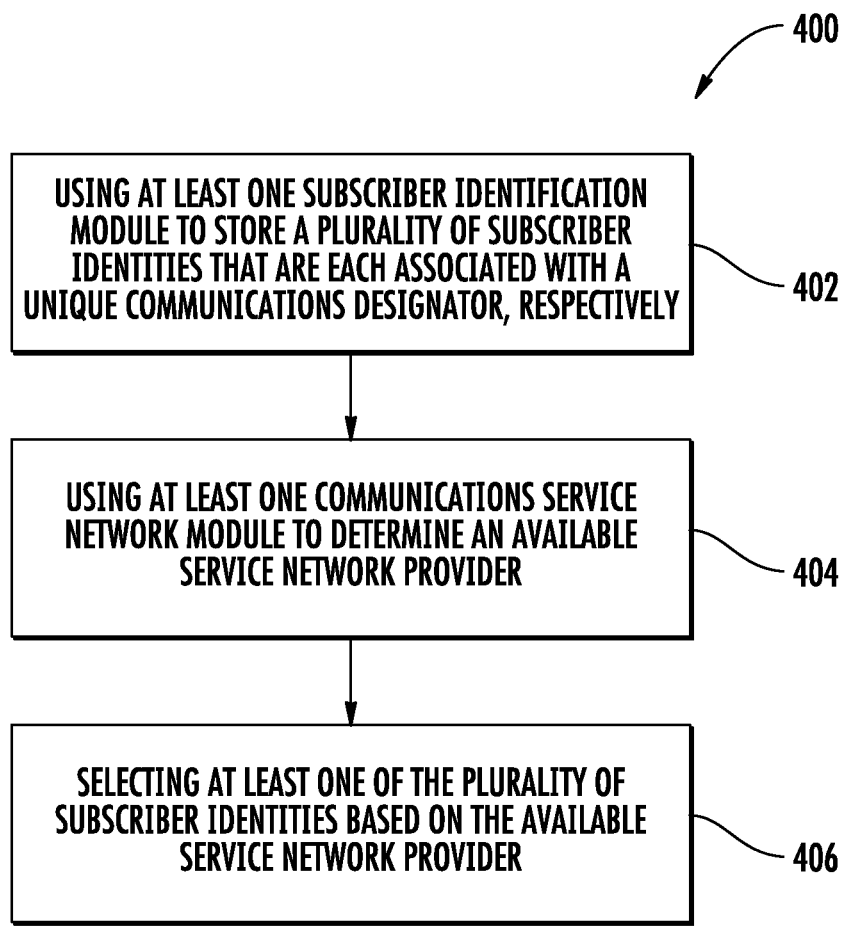
FIG. 4 shows a flow chart depicting a method in accordance with one embodiment.

Referring now to FIG. 4, a flow chart depicting a method 400 is shown in accordance with one embodiment, wherein method 400 may comprise using at least one SIM to store a plurality of subscriber identities that are each associated with a unique communications designator, respectively (block 402), using at least one communications service network module to determine an available service network provider (block 404), and selecting at least one of the plurality of subscriber identities based on the available service network provider (block 406).

In some embodiments, the SIM may comprise any or all of those embodiments presently and previously disclosed herein, including those embodiments described above with reference to FIGS. 1A through 3.

In some embodiments, the subscriber identities may comprise any or all of those embodiments presently and previously disclosed herein, including those embodiments described above with reference to FIGS. 1A through 3.

In yet another embodiment, the unique communications designator may comprise any or all of those embodiments presently and previously disclosed herein, including those embodiments described above with reference to FIGS. 1A through 3.

In yet another embodiment, the at least one communications service network module may comprise any or all of those embodiments presently and previously disclosed herein, including those embodiments described above with reference to FIGS. 1A through 3.

In another embodiment, the service network provider may comprise any or all of those embodiments presently and previously disclosed herein, including those embodiments described above with reference to FIGS. 1A through 3.

In some embodiments, using at least one subscriber identification module to store a plurality of subscriber identities may comprise any or all of those embodiments presently and previously disclosed herein, including those embodiments described above with reference to FIGS. 1A through 3.

In some embodiments, using at least one communications service network module to determine an available service network provider may comprise any or all of those embodiments presently and previously disclosed herein, including those embodiments described above with reference to FIGS. 1A through 3.

In yet another embodiment, selecting at least one of the plurality of subscriber identities may comprise any or all of those embodiments presently and previously disclosed herein, including those embodiments described above with reference to FIGS. 1A through 3.

In some embodiments, method 400 may comprise using at least one location determination module to determine at least one location of the at least one location determination module, at least one subscriber identification module, or a device containing the at least one location determination module, and selecting a subscriber identity based on the at least one location. In some embodiments, using at least one location determination module may comprise any or all of those embodiments presently and previously disclosed herein, including those embodiments described above with reference to FIGS. 1A through 3.

In a further embodiment, method 400 may comprise associating a subscriber identity with a geographic location, such as a location determined by the location determination module, or a communications network service provider. In some embodiments, associating may comprise any or all of those embodiments presently and previously disclosed herein, including those embodiments described above with reference to FIGS. 1A through 3.

In yet another embodiment, selecting at least one of the plurality of subscriber identities based on the available service network provider (block 406) may comprise automatically selecting at least one of the plurality of subscriber identities based on the available service network provider. In some embodiments, automatically selecting may comprise any or all of those embodiments presently and previously disclosed herein, including those embodiments described above with reference to FIGS. 1A through 3, including automatically selecting a subscriber identity after a user has been presented with the option to select a subscriber identity.

Hardware and Operating Environment

This section provides an overview of example hardware and the operating environments in conjunction with which embodiments of the inventive subject matter can be implemented. A software program may be launched from a computer readable medium in a computer-based system to execute the functions defined in the software program. Various programming languages may be employed to create software programs designed to implement the system 100 and method 200, 400 disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 5 below.

Figure 5:
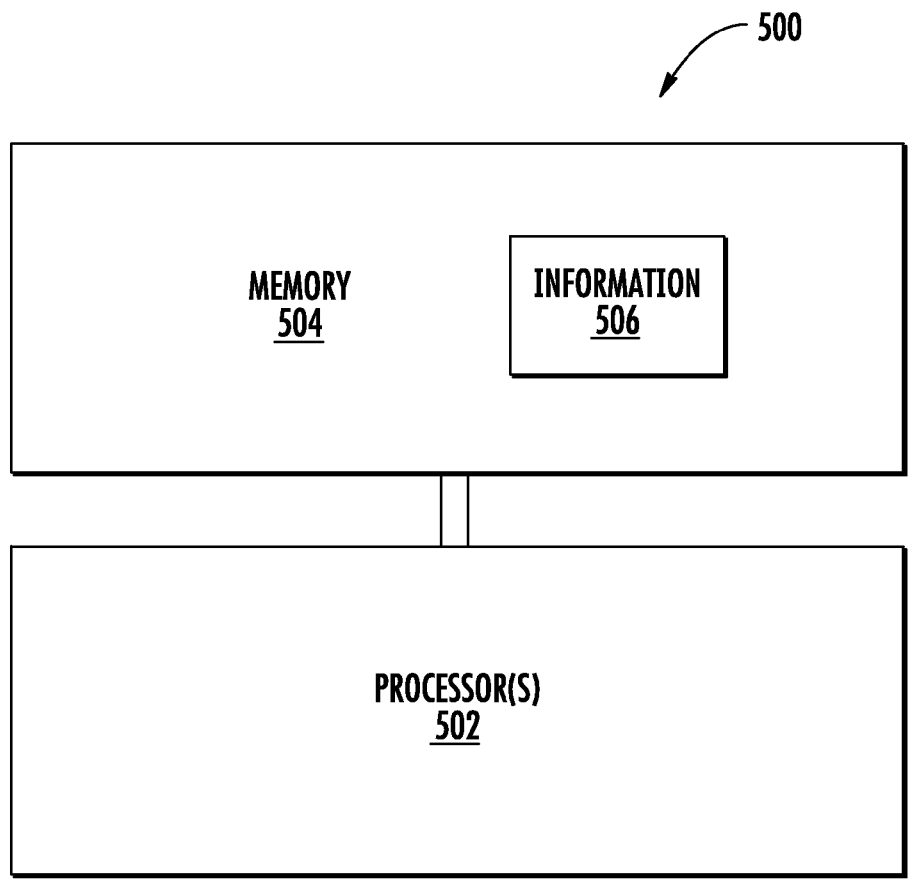
FIG. 5 shows a apparatus in accordance with one embodiment.

FIG. 5 is a block diagram representing an apparatus 500 according to various embodiments. Such embodiments may comprise a computer, a memory system, a magnetic or optical disk, some other storage device, or any type of electronic device or system. The apparatus 500 may include one or more processor(s) 502 coupled to a machine-accessible medium such as a memory 504 (e.g., a memory including electrical, optical, or electromagnetic elements). The medium may contain associated information 506 (e.g., computer program instructions, data, or both), which, when accessed, results in a machine (e.g., the processor(s) 504) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising:
   at least one processor;
   at least one subscriber identification module connected to the at least one processor, wherein each of the at least one subscriber identification module is operative to each store at least one subscriber identity that is associated with a unique communications designator, wherein the communications designator is any one of a telephone number, an e-mail address, an instant messaging account and social media account, respectively;
   at least one location determination module connected to the at least one processor; and
   computer executable instructions readable by the at least one processor and operative to:
      use the at least one location determination module to determine at least one location of the at least one location determination module, at least one processor, or at least one subscriber identification module; and
      select the at least one subscriber identity based on the at least one location.

2. The system of claim 1, further comprising at least one communications service network module, wherein the at least one communications service network module is connected to the at least one processor.

3. The system of claim 2, wherein the computer executable instructions are operative to use the at least one communications service network module to determine an available service network provider, and select a subscriber identity based on the available service network provider.

4. The system of claim 2, wherein the computer executable instructions are operative to determine when a subscriber identity has been selected, and use the at least one communications service network module to notify a smart subscriber identification module card service provider that a subscriber identity has been selected.

5. The system of claim 4, wherein the smart subscriber identification module card service provider is operative to assess a fee to a user of the system upon being notified that a subscriber identity has been selected.

6. The system of claim 4, wherein the smart subscriber identification module card service provider is operative to broker a roaming fee between a user's primary or domestic communications network service provider and a user's secondary or foreign communications network service provider.

7. The system of claim 1, wherein the computer executable instructions are operative to present an option to a select a subscriber identity.

8. The system of claim 1, wherein selecting at least one of the plurality of subscriber identities based on the at least one location comprises automatically selecting at least one of the plurality of subscriber identities based on the at least one location.

9. The system of claim 1, wherein each subscriber identity is associated with a geographic location or a communications network service provider.

10. A method comprising:
    using at least one subscriber identification module to each store at least one subscriber identity that is associated with a unique communications designator, wherein the communications designator is any one of a telephone number, an e-mail address, an instant messaging account and social media account, respectively;
    using at least one location determination module to determine at least one location of the at least one location determination module, a device containing the at least one location determination module, or the at least one subscriber identification module; and
    selecting the at least one subscriber identity based on the at least one location.

11. The method of claim 10, further comprising using at least one communications service network module to determine an available service network provider, and selecting a subscriber identity based on the available service network provider.

12. The method of claim 10, further comprising assessing a fee to a user when a subscriber identity has been selected.

13. The method of claim 10, further comprising brokering a roaming fee between a user's primary or domestic communications network service provider and a user's secondary or foreign communications network service provider.

14. The method of claim 10, further comprising presenting a subscriber identity selection.

15. The method of claim 10, further comprising associating a subscriber identity with a geographic location or a communications network service provider.

16. The method of claim 10, wherein selecting at least one of the plurality of subscriber identities based on the at least one location comprises automatically selecting at least one of the plurality of subscriber identities based on the at least one location.

17. A method comprising:
    using at least one subscriber identification module to each store at least one subscriber identity that is associated with a unique communications designator, wherein the communications designator is any one of a telephone number, an e-mail address, an instant messaging account and social media account, respectively;
    using at least one communications service network module to determine an available service network provider; and
    selecting the at least one subscriber identity based on the available service network provider.

18. The method of claim 17, further comprising using at least one location determination module to determine at least one location of the at least one location determination module, at least one subscriber identification module, or a device containing the at least one location determination module, and selecting a subscriber identity based on the at least one location.

19. The method of claim 17, further comprising associating a subscriber identity with a geographic location or a communications network service provider.

20. The method of claim 17, wherein selecting at least one of the plurality of subscriber identities based on the available service network provider comprises automatically selecting at least one of the plurality of subscriber identities based on the available service network provider.

* * * * *